United States Patent
Torii et al.

(10) Patent No.: US 11,949,318 B2
(45) Date of Patent: Apr. 2, 2024

(54) ROTARY ELECTRIC MACHINE (71) Applicant: AISIN CORPORATION, Anjo (JP)

(72) Inventors: Takeshi Torii, Anjo (JP); Takuro Iwase, Anjo (JP); So Shiraiwa, Anjo (JP)

(73) Assignee: AISIN CORPORATION, Kariya (JP)

( * ) Notice: Subject to any disclaimer, the term of this patent is extended or adjusted under 35 U.S.C. 154(b) by 467 days.

(21) Appl. No.: 17/274,351

(22) PCT Filed: Dec. 25, 2019

(86) PCT No.: PCT/JP2019/050918
§ 371 (c)(1),
(2) Date: Mar. 8, 2021

(87) PCT Pub. No.: WO2020/194959
PCT Pub. Date: Oct. 1, 2020

(65) Prior Publication Data
US 2021/0313859 A1    Oct. 7, 2021

(30) Foreign Application Priority Data
Mar. 28, 2019   (JP) ................. 2019-063169

(51) Int. Cl.
*H02K 5/20* (2006.01)
*H02K 9/19* (2006.01)

(52) U.S. Cl.
CPC ............ *H02K 5/207* (2021.01); *H02K 5/203* (2021.01); *H02K 9/19* (2013.01)

(58) Field of Classification Search
CPC .......... H02K 5/203; H02K 5/207; H02K 9/19
See application file for complete search history.

(56) References Cited

U.S. PATENT DOCUMENTS

2014/0294631 A1   10/2014 Kanazawa et al.
2015/0069862 A1    3/2015 Bulatow
(Continued)

FOREIGN PATENT DOCUMENTS

CN   202026203 U  * 11/2011
DE    19810437 A1 *  3/1999   ............... H02K 1/32
(Continued)

OTHER PUBLICATIONS

Feb. 10, 2020 International Search Report issued in International Patent Application No. PCT/JP2019/050918.
(Continued)

Primary Examiner — Jue Zhang
(74) Attorney, Agent, or Firm — Oliff PLC (57) ABSTRACT An air chamber serving as a breather chamber and a breather hole that communicates the outside of a case and the air chamber can be easily molded, and breather hole is provided so as to have a degree of freedom in an installation position and volume, so that oil does not easily blow out from case in which rotary electric machine is housed. Case housing rotary electric machine has an inner and outer case portion. Inner case portion has a first coupling portion. Outer case portion has a second coupling portion. The first and second coupling portions are fixed to each other. An air chamber communicated with an inside of inner case portion is formed between outer surface of inner case portion and inner surface of outer case portion. A breather hole that communicates air chamber and an outside of case is formed in outer case portion.

9 Claims, 4 Drawing Sheets (56) References Cited

U.S. PATENT DOCUMENTS

2015/0084460 A1    3/2015   Shiraishi et al.
2015/0130310 A1    5/2015   Shiraishi et al.

FOREIGN PATENT DOCUMENTS

| JP | 2005-278319 A | 10/2005 |
| JP | 2017-161000 A | 9/2017 |

OTHER PUBLICATIONS

Oct. 28, 2021 Extended European Search Report issued in European Application No. 19921344.8.

* cited by examiner

ROTARY ELECTRIC MACHINE

TECHNICAL FIELD

The present disclosure relates to a rotary electric machine including a case that houses a stator and a rotor.

BACKGROUND ART

Japanese Unexamined Patent Application Publication No. 2017-161000 (JP 2017-161000 A) discloses a power device of an automobile in which a rotary electric machine (11), a speed reduction device (12), and a differential gear (13) are housed in a case (reference symbols in parentheses in the background art are the reference symbols of the referenced document). The case is provided with a breather hole (communication hole (50b)) for reducing a pressure difference between the inside and outside of the case. In contrast, inside the case, there is oil for cooling and lubricating the rotary electric machine (11), the speed reduction device (12), and the differential gear (13), and this oil is scattered inside the case due to the rotation of the gears and the like. In order to suppress the scattered oil from going outside of the case through the breather hole (communication hole (50b)), an air chamber (breather chamber (50)) for capturing the scattered oil is formed on an inner side of the case with respect to the breather hole (communication hole (50b)).

RELATED ART DOCUMENTS

Patent Documents

Patent Document 1: Japanese Unexamined Patent Application Publication No. 2017-161000 (JP 2017-161000 A)

SUMMARY OF THE DISCLOSURE

Problem to be Solved by the Disclosure

In the above power device, in order to suppress the oil from blowing out of the breather hole (communication hole (50b)) when oil is stirred inside the power device, an intricate wall is formed in the case and a space between the air chamber (breather chamber (50)) and a chamber in which stirring is performed is set as a labyrinth structure. Thus, it is necessary to perform molding with a complicated mold by casting, and the position and volume of the air chamber (breather chamber (50)) are limited.

In view of the above background, it is desirable that an air chamber serving as a breather chamber and a breather hole that communicates the outside of a case with the air chamber can be simply molded, and the breather hole is provided so as to have a degree of freedom in an installation position and volume, so that oil does not easily blow out from the case in which the rotary electric machine is housed.

Means for Solving the Problem

As one aspect, a rotary electric machine in view of the above includes: a stator; a rotor; and a case for housing the stator and the rotor are provided, in which the case includes an inner case portion to which the stator is fixed and an outer case portion that houses the inner case portion, the inner case portion includes a first coupling portion, the outer case portion includes a second coupling portion, the first coupling portion and the second coupling portion are fixed to each other, an air chamber communicated with an inside of the inner case portion is formed between an outer surface of the inner case portion and an inner surface of the outer case portion, and a breather hole that communicates the air chamber and an outside of the case is formed in the outer case portion.

According to this configuration, the air chamber that is a breather chamber, which is communicated with the inside of the inner surface, is formed between the outer surface of the inner case portion to which the stator is fixed and the inner surface of the outer case portion that houses the inner case portion. That is, it is not necessary to perform molding with a complicated mold by casting, and the position and volume of the air chamber can be easily set freely. Further, since the air chamber is formed as a chamber independent of an internal space, on the outside with respect to the outer surface of the inner case portion in which the rotary electric machine is housed, it is possible to suppress oil from directly entering the air chamber even when oil is stirred by the rotor, etc. of the rotary electric machine, in the internal space of the inner case portion. Thus, it is possible to suppress oil from being blown out from the breather hole that communicates the outside of the case and the air chamber. In this way, according to the present configuration, an air chamber serving as a breather chamber and a breather hole that communicates the outside of a case with the air chamber can be easily molded, and the breather hole can be provided so as to have a degree of freedom in an installation position and volume, so that oil does not easily blow out from the case in which the rotary electric machine is housed.

Further features and advantages of the rotary electric machine will be clarified from the following description of the embodiments described with reference to the drawings.

MODES FOR CARRYING OUT THE DISCLOSURE

Figure 3:
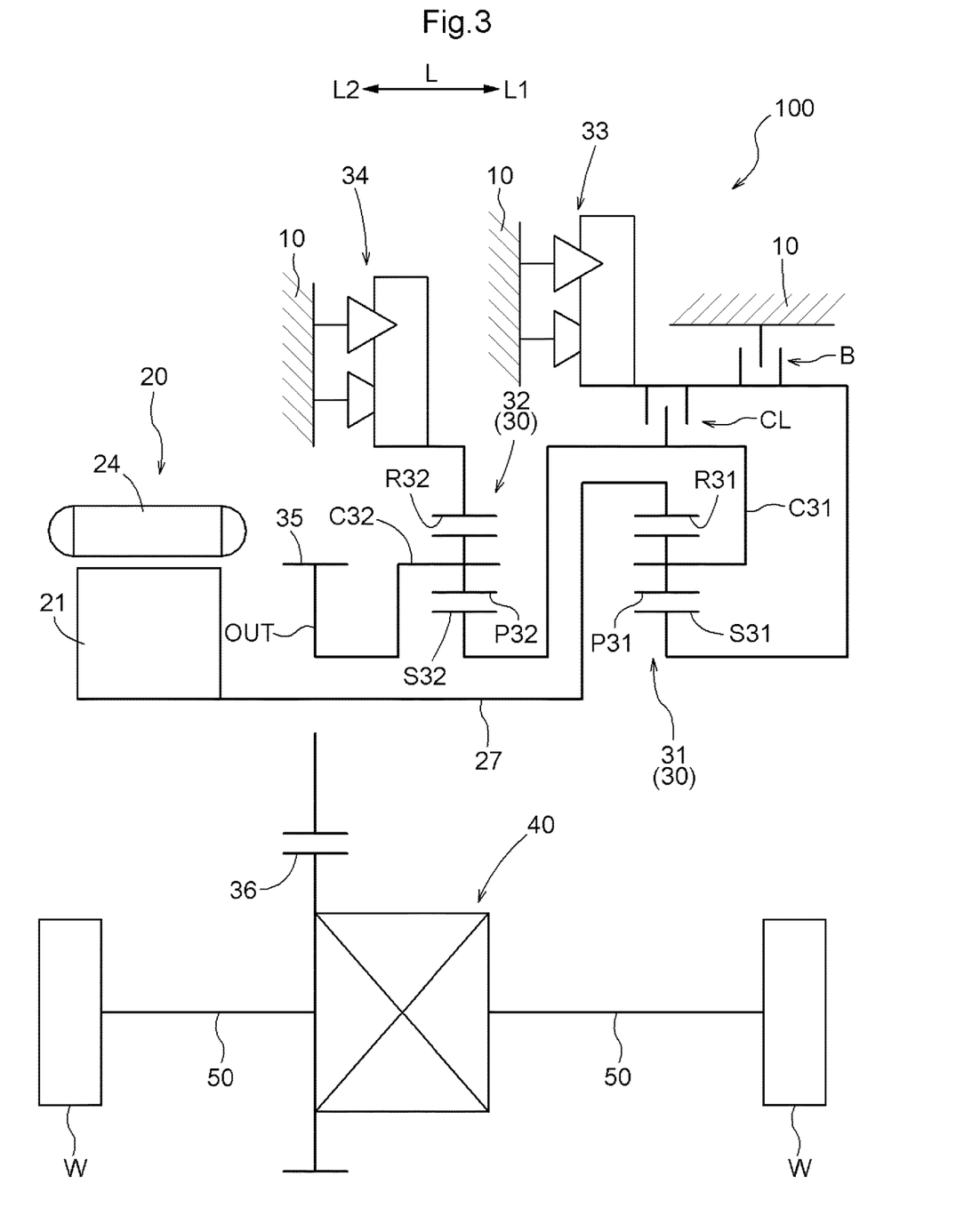
FIG. 3 is a skeleton diagram of a vehicle drive device in FIG. 1.

Hereinafter, an embodiment of the rotary electric machine will be described with reference to the drawings. As shown in a skeleton diagram of FIG. 3 showing an example of a vehicle drive device 100 provided with a rotary electric machine 20, the vehicle drive device 100 is a drive device that is installed in an electric vehicle or a hybrid vehicle in which at least the rotary electric machine 20 is a driving force source of wheels W, for example. As shown in FIG. 3, the vehicle drive device 100 of the present embodiment only includes the rotary electric machine 20 as a driving force source of the wheels W. In the case of a two-wheel drive four-wheel vehicle, an electric vehicle can thus be realized. Further, in the case of a four-wheel drive four-wheel vehicle, a hybrid vehicle can be realized by driving the other two wheels with, for example, a driving force of an internal combustion engine (not shown). Of course, in the case of a four-wheel drive four-wheel vehicle, a four-wheel drive electric vehicle can be realized by driving the other two wheels with a rotary electric machine different from the rotary electric machine 20.

In the following description, "drivingly coupled" refers to a state in which two rotation elements are coupled so that a driving force can be transmitted, and includes a state in which the two rotation elements are coupled so as to rotate integrally or a state in which the two rotation elements are coupled so as to be able to transmit a driving force via one or two or more transmitting members. Such transmitting members include various members that transmit rotation at the same speed or at a shifted speed, such as a shaft, a gear mechanism, a belt, a chain, and the like, for example. The transmitting members may include an engagement device that selectively transmits rotation and driving force, such as a friction engagement device, a gear engagement device, and the like. However, in a speed reduction device 30 and a differential gear device 40 described below, when each rotation element is referred to be "drivingly coupled", this indicates a state in which three or more rotation elements provided in the device are drivingly coupled to each other without interposing other rotation elements.

Further, in the following description, when expressed as a "tubular shape", a "cylindrical shape", etc., this means that the general shape as a whole is a tube or a cylinder even if there is a slightly deformed part. Not limited to these, the same applies to other expressions used with "shape" regarding the shape and the like.

As shown in FIG. 3, the vehicle drive device 100 includes the rotary electric machine 20, the output member OUT that is drivingly coupled to the wheels W, and the speed reduction device 30 (first planetary gear device 31 and second planetary gear device 32). The first planetary gear device 31 and the second planetary gear device 32 are provided in the described order in a power transmission path connecting the rotary electric machine 20 and the output member OUT. Further, the vehicle drive device 100 includes a clutch CL, a brake B, a first selectable one-way clutch 33, and a second selectable one-way clutch 34. The rotary electric machine 20, the output member OUT, the first planetary gear device 31, the second planetary gear device 32, the clutch CL, the brake B, the first selectable one-way clutch 33, and the second selectable one-way clutch 34 are housed in a case 10.

The rotary electric machine 20, the speed reduction device 30 (first planetary gear device 31 and second planetary gear device 32), and the output member OUT are coaxially disposed. Further, the rotary electric machine 20, the output member OUT, the second planetary gear device 32, and the first planetary gear device 31 are disposed side by side in the axial direction L in the described order. Thus, a direction along a rotor shaft 27 of the rotary electric machine 20 is equivalent to a direction along a rotation shaft of the speed reduction device 30, and a direction along a diameter of the rotor shaft 27 of the rotary electric machine 20 is equivalent to a direction along a diameter of the speed reduction device 30. In the present embodiment, the direction along the rotor shaft 27 of the rotary electric machine 20 is referred to as an axial direction L of the rotary electric machine 20 and the speed reduction device 30, and the direction along the diameter of the rotor shaft 27 of the rotary electric machine 20 is referred to as a radial direction R of the rotary electric machine 20 and the speed reduction device 30. Further, in the axial direction L, a side on which the speed reduction device 30 is disposed with respect to the rotary electric machine 20 is referred to as an axial direction first side L1, and a side on which the rotary electric machine 20 is disposed with respect to the speed reduction device 30 is referred to as an axial direction second side L2.

In the radial direction R, a side away from the rotor shaft 27 is referred to as an outer radial side R1, and a side closer to the rotor shaft 27 is referred to as an inner radial side R2.

Further, assuming that an axis on which the rotary electric machine 20, the first planetary gear device 31, the second planetary gear device 32, and the output member OUT are disposed is a first axis, the differential gear device 40 and vehicle shafts 50 are disposed on a second axis parallel to the first axis. The output member OUT is drivingly coupled to the pair of left and right wheels W via the differential gear device 40 and the pair of left and right vehicle shafts 50.

The first planetary gear device 31 is configured of a single pinion type planetary gear mechanism. The first planetary gear device 31 includes a first sun gear S31, a first pinion gear P31, a first carrier C31, and a first ring gear R31. The order of rotation speeds of the first sun gear S31, the first carrier C31, and the first ring gear R31 is the described order. The first sun gear S31 is selectively fixed to the case 10 by the brake B and the first selectable one-way clutch 33. The first ring gear R31 is drivingly coupled to the rotary electric machine 20 via the rotor shaft 27. The first pinion gear P31 that meshes with both the first sun gear S31 and the first ring gear R31 is supported by the first carrier C31. The first carrier C31 is drivingly coupled to the output member OUT via the second planetary gear device 32.

The second planetary gear device 32 is configured of a single pinion type planetary gear mechanism. The second planetary gear device 32 includes a second sun gear S32, a second pinion gear P32, a second carrier C32, and a second ring gear R32. The order of rotational speeds of the second sun gear S32, the second carrier C32, and the second ring gear R32 is the described order. The second sun gear S32 is drivingly coupled to the rotary electric machine 20 via the first planetary gear device 31. The second ring gear R32 is selectively fixed to the case 10 by the second selectable one-way clutch 34. The second pinion gear P32 that meshes with both the second sun gear S32 and the second ring gear R32 is supported by the second carrier C32. The second carrier C32 is drivingly coupled to the output member OUT.

The differential gear device 40 has a differential case serving as an input element, a pinion shaft supported by the differential case so as to rotate integrally with the differential case, a first differential pinion gear and a second differential pinion gear that are rotatably supported with respect to the pinion shaft, and a first side gear and a second side gear serving as distribution output elements, all of which are not shown. The first side gear and the second side gear are each drivingly coupled to the vehicle shafts 50. For example, the first differential pinion gear, the second differential pinion gear, the first side gear, and the second side gear are all bevel gears, and the differential gear device 40 is a differential gear device having a bevel gear type gear mechanism. An output gear 35 is drivingly coupled to a differential case 36 of the differential gear device 40.

Figure 1:
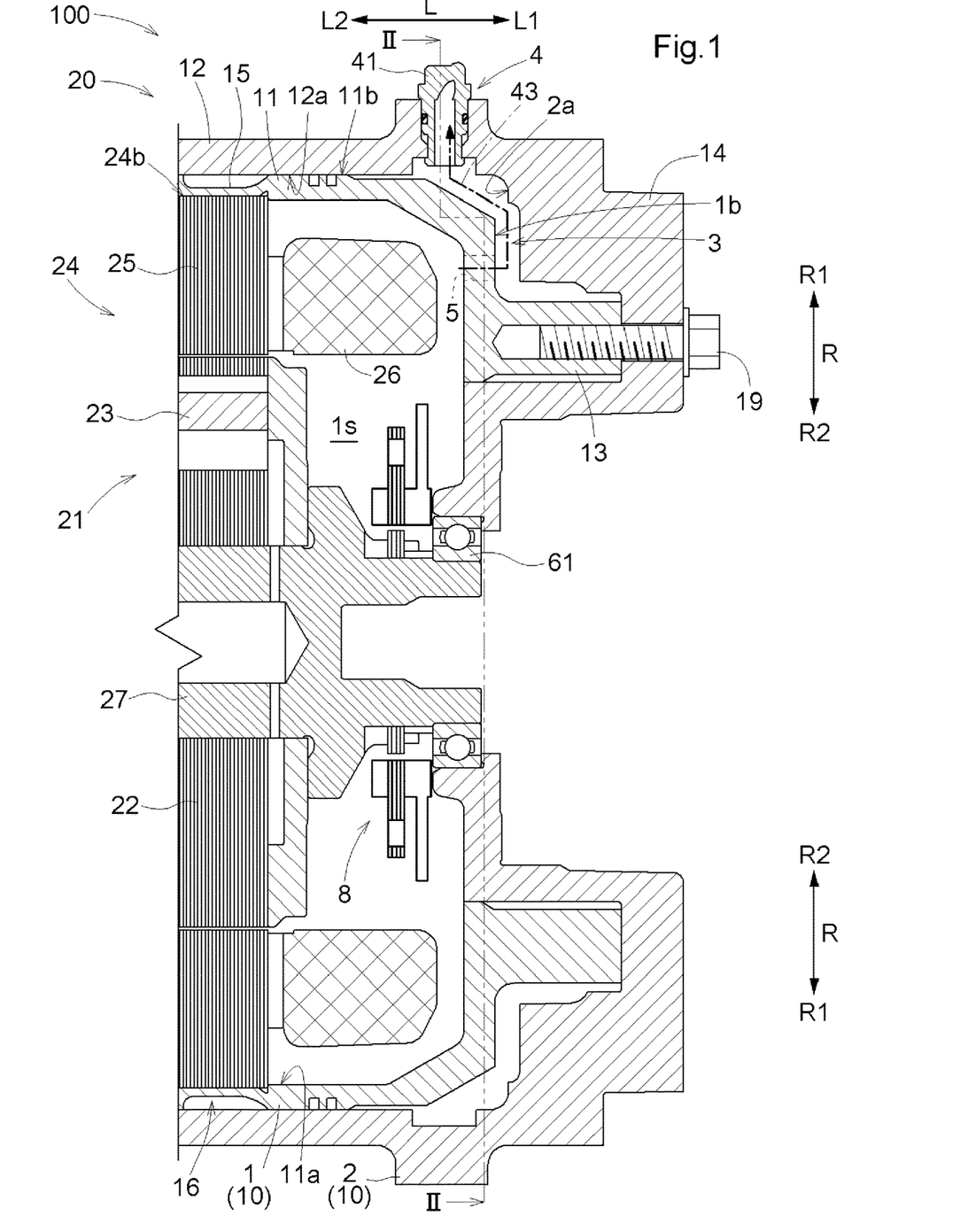
FIG. 1 is an axial sectional view showing an example of a rotary electric machine.

As shown in FIG. 1, the case 10 includes an inner case portion 1 and an outer case portion 2 with a double-tubular structure that at least houses the rotary electric machine 20. The inner case portion 1 is housed in the outer case portion 2 on the inner radial side R2 so that the entire region of the inner case portion 1 overlaps with the outer case portion 2 in the radial direction R view.

The rotary electric machine 20 is a permanent magnet type rotary electric machine that includes a rotor 21 having a permanent magnet 23 inside a rotor core 22, a stator 24 having a stator coil 26 wound around a stator core 25, and the rotor shaft 27 coupled to the rotor core 22. On the inner radial side R2 of the rotor core 22, the rotor shaft 27 is coupled to the rotor core 22, and the rotor 21 and the rotor shaft 27 rotate integrally. Although the rotary electric machine 20 is a permanent magnet type rotary electric machine in the present embodiment, the rotary electric machine 20 may be another type of rotary electric machine such as an induction type rotary electric machine. The rotary electric machine 20 is electrically connected to a power storage device (not shown) such as a battery or a capacitor, and receives a supply of power from the power storage device to perform power running, or supplies power generated by inertial force of the vehicle or the like to the power storage device so as to store power.

That is, the rotary electric machine 20 includes the stator 24, the rotor 21, and the case 10 for housing the stator 24 and the rotor 21, and the case 10 includes the inner case portion 1 to which the stator 24 is fixed and the outer case portion 2 that houses the inner case portion 1. The inner case portion 1 includes a first coupling portion 13, the outer case portion 2 includes a second coupling portion 14, and the first coupling portion 13 and the second coupling portion 14 are fixed to each other. In the present embodiment, the inner case portion 1 has a first tubular portion 11 having an inner peripheral surface 11a in contact with an outer peripheral surface 24b of the stator 24, and the first coupling portion 13 that protrudes in the radial direction R (here, toward the inner radial side R2) from the first tubular portion 11 on the axial direction first side L1 with respect to the stator 24. The outer case portion 2 has a second tubular portion 12 that has a tubular shape and that covers the outer peripheral surface 11b of the first tubular portion 11 of the inner case portion 1, and the second coupling portion 14 that protrudes in the radial direction R (here, toward the inner radial side R2) from the second tubular portion 12 on the axial direction first side L1 with respect to the first coupling portion 13 of the inner case portion 1.

The inner case portion 1 and the outer case portion 2 are coupled by fixing the first coupling portion 13 and the second coupling portion 14 to each other. In the present embodiment, the first coupling portion 13 and the second coupling portion 14 are fixed by a fastening member such as a bolt 19. In the present embodiment, the first coupling portion 13 and the second coupling portion 14 are fixed while being in contact with each other in the axial direction L. Thus, the inner case portion 1 and the outer case portion 2 can be fixed to each other in a state in which the two are appropriately positioned, while suppressing outer shapes of the inner case portion 1 and the outer case portion 2 from becoming large in the radial direction R.

Further, the second coupling portion 14 supports a rotor bearing 61 (first rotor bearing) that supports the rotor 21 such that the rotor 21 is rotatable, on the axial direction first side L1, which is one side in the axial direction L with respect to the rotor 21. Since the rotor 21 can also be supported by the second coupling portion 14 that fixes the inner case portion 1 and the outer case portion 2, the structure of the rotary electric machine 20 can be simplified. The rotor shaft 27 is rotatably supported via a rotor bearing (second rotor bearing) that is not shown, on the axial direction second side L2 with respect to the rotor core 22. As a matter of course, this does not prevent the form in which the rotor bearing 61 is supported by a member different from the second coupling portion 14.

A groove portion 15 is formed in the outer peripheral surface 11b of the first tubular portion 11 of the inner case portion 1 so as to include a part that is in contact with an inner peripheral surface 12a of the second tubular portion 12 and a part spaced away from the inner peripheral surface 12a of the second tubular portion 12. As a result, a coolant flow path 16 through which coolant flows is formed between the first tubular portion 11 and the second tubular portion 12. The groove portion 15 may be formed so as to be continuous in a spiral shape on the outer peripheral surface 11b of the first tubular portion 11, or may be formed as a plurality of grooves in which each groove is independent. Further, instead of such a groove portion 15, the form may be such that a recessed portion that is recessed to the inner radial side R2 is formed on the outer peripheral surface 11b of the first tubular portion 11 over the circumferential direction, and one large coolant flow path 16 is formed.

In the present embodiment, a form is shown as an example in which the inner case portion 1 includes the first tubular portion 11, the outer case portion 2 includes the second tubular portion 12, the coolant flow path 16 is formed between the first tubular portion 11 and the second tubular portion 12, the first tubular portion 11 and the first coupling portion 13 are coupled, and the second tubular portion 12 and the second coupling portion 14 are coupled. That is, although a configuration in which the case 10 is provided with a so-called coolant jacket is illustrated, the configuration may be such that the case 10 is simply divided into two members that are the inner case portion 1 and the outer case portion 2, without being provided with such a cold water jacket.

By the way, the case 10 is provided with a breather hole 4 for reducing a pressure difference between the inside and the outside of the case 10, and a breather plug 41 is provided in the breather hole 4. Inside the case 10, there is oil for cooling and lubricating the rotary electric machine 20, the speed reduction device 30, the differential gear device 40, etc., and this oil is scattered inside the case 10 due to rotation of gears and the like. In order to suppress the scattered oil from going outside of the case 10 through the breather hole 4, an air chamber 3 (breather chamber) for capturing the scattered oil is formed on an inner side of the case 10 with respect to the breather hole 4. In the present embodiment, as shown in FIG. 1, the air chamber 3 is formed between an outer surface 1b of the inner case portion 1 and an inner surface 2a of the outer case portion 2, and the breather hole 4 that communicates the air chamber 3 and the outside of the case 10 is formed in the outer case portion 2.

As shown in FIG. 1, in the present embodiment, the air chamber 3 is formed on the outer side with respect to the outer surface 1b of the inner case portion 1 in which the rotary electric machine 20 is housed. Thus, even when oil is stirred by the rotor 21 or the like of the rotary electric machine 20 in a housing space 1s of the inner case portion 1, it is possible to suppress oil from directly entering the air chamber 3. As a result, it is possible to suppress oil from being blown out from the breather hole 4 that communicates the outside of the case 10 and the air chamber 3.

Further, as shown in FIG. 1, in the present embodiment, the first coupling portion 13 is formed so as to protrude toward the inner radial side R2 from the first tubular portion 11, on the axial direction first side L1 that is one side of the axial direction L with respect to the stator 24. Further, the second coupling portion 14 is formed so as to protrude toward the inner radial side R2 from the second tubular portion 12, on the axial direction first side L1. The air chamber 3 is formed so as to include a region formed in a space in which the first coupling portion 13 and the second coupling portion 14 face each other in the axial direction L. As a result, the air chamber 3 can be provided with a part extending in the radial direction R (up-down direction in the present example) along a space between the first coupling portion 13 and the second coupling portion 14 facing each other. Thus, even when oil enters the air chamber 3, it becomes difficult for this oil to reach the breather hole 4 formed in the outer case portion 2.

Figure 2:
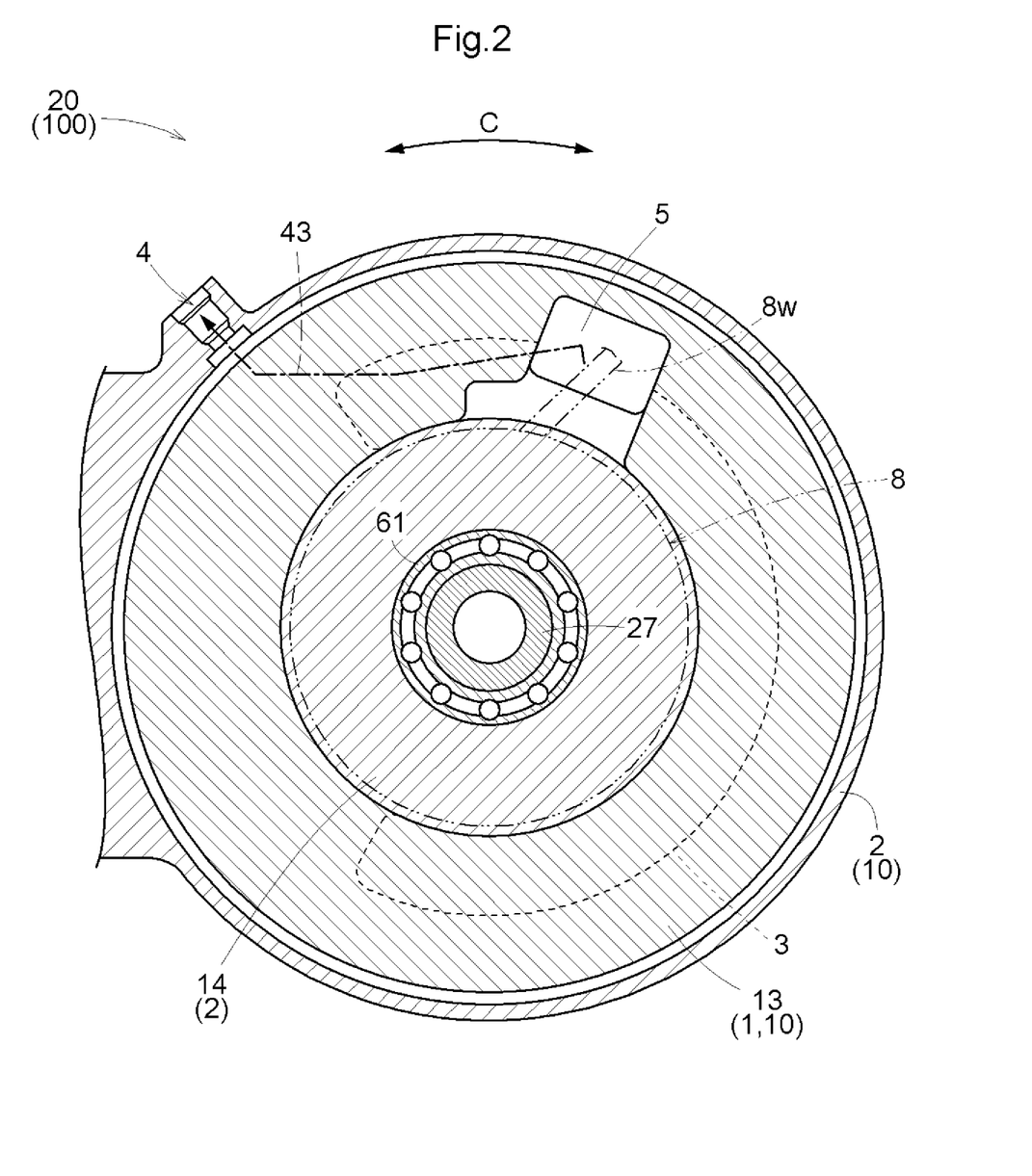
FIG. 2 is a schematic cross-sectional view orthogonal to an axial direction of a first coupling portion passing through a communication portion.

As shown in FIGS. 1 and 2, the inner case portion 1 includes a communication portion 5 that communicates the housing space 1s in which the stator 24 is housed and the air chamber 3. With this communication portion 5, the housing space is and the outside of the case 10 can be appropriately communicated via the air chamber 3 and the breather hole 4. As a result, a change in internal pressure of the case 10 due to the expansion or contraction of air in the housing space 1s can be reduced. Further, since the communication portion 5 is formed in the inner case portion 1 provided so as to surround the stator 24, the communication portion 5 can be disposed with a high degree of freedom. That is, in the present embodiment, it is easy to dispose the communication portion 5 at an appropriate position with respect to the air chamber 3 and the breather hole 4.

Here, the communication portion 5 is formed so as to pass through, in the axial direction L, the first coupling portion 13 that is formed so as to protrude from the first tubular portion 11 to the inner radial side R2. The oil that is present inside the housing space 1s is often scattered in the radial direction R due to centrifugal force and the like of a rotating member such as the rotor 21 of the rotary electric machine 20. When the communication portion 5 is formed along the axial direction L in this way, the possibility that oil scattered in the radial direction R passes through the communication portion 5 to enter the air chamber 3 can be decreased, compared to the case in which the communication portion 5 is formed along the radial direction R.

Further, as shown in FIG. 2, which is a schematic cross-sectional view in the axial direction along the axial direction L (cross-sectional view taken along II-II in FIG. 1), in the present embodiment, the breather hole 4 and the communication portion 5 are disposed at different positions in a circumferential direction C of the stator 24. Thus, a path from the housing space 1s to the breather hole 4 (for example, a path 43 as shown by a virtual line in FIG. 2) may be set so that oil inside the housing space 1s does not easily reach the breather hole 4. That is, the length of the path 43 can be ensured and the shape of the path 43 can be a bent shape. In the present embodiment, this path 43 is a path that is bent a plurality of times in the radial direction and the circumferential direction so as to be first extended to the axial direction first side L1 (see FIG. 1), then extended to a circumferential direction first side (counterclockwise side in FIG. 2), and then to the outer radial side, from the housing space 1s toward the breather hole 4.

A wiring member (for example, a resolver wiring 8w) disposed over the housing space 1s and the space outside the inner case portion 1 can be inserted in the communication portion 5. In the present embodiment, as shown by a virtual line in FIG. 2, the wiring of the resolver (resolver wiring 8w), which is an example of a rotation sensor disposed in the housing space 1s is inserted in the communication portion 5 in order to detect rotation (magnetic pole position, rotation speed) of the rotor 21. By sharing the communication portion 5 as a wiring region, it is possible to save space as compared to the case in which the communication portion 5 that communicates the air chamber 3 and the housing space 1s is provided so as to be dedicated as an air passage. In the present embodiment, a form is shown as an example in which the resolver wiring 8w is inserted in the communication portion 5. However, other wiring may be used. For example, the wiring may a wiring of a current sensor that detects an alternating current flowing through the multi-phase stator coil 26. Further, as a matter of course, it is not always necessary that some kind of wiring member is inserted in the communication portion 5, and the communication portion 5 may be a mere hole.

Further, in the present embodiment, the breather hole 4 is formed so as to pass through the outer case portion 2 in the radial direction R. The breather hole 4 is often disposed in an upper portion of the case 10 in a state in which the rotary electric machine 20 is mounted on the vehicle so that water or the like does not easily enter the inside of the case 10. In many cases, the rotary electric machine 20 that is a driving force source of the vehicle is disposed so that the rotation shaft is in a horizontal direction. Thus, when the breather hole 4 is formed so as to pass through the outer case portion 2 in the radial direction R, the breather hole 4 can be easily disposed in the upper portion of the case 10. The upper portion of the case 10 is not limited to a vertical direction, and includes a range inclined downward within a range of less than 90 degrees from a direction from the rotor shaft 27 toward the vertical direction.

As described above, according to the present embodiment, the air chamber 3 serving as the breather chamber and the breather hole 4 that communicates the outside of the case 10 and the air chamber 3 can be provided so that oil is less likely to be blown out from the case 10 in which the rotary electric machine 20 is housed.

Other Embodiments

Hereinafter, other embodiments will be described. It should be noted that the configurations of each embodiment described below are not limited to be applied independently, and can be applied in combination with the configurations of other embodiments as long as there is no contradiction.

Figure 4:
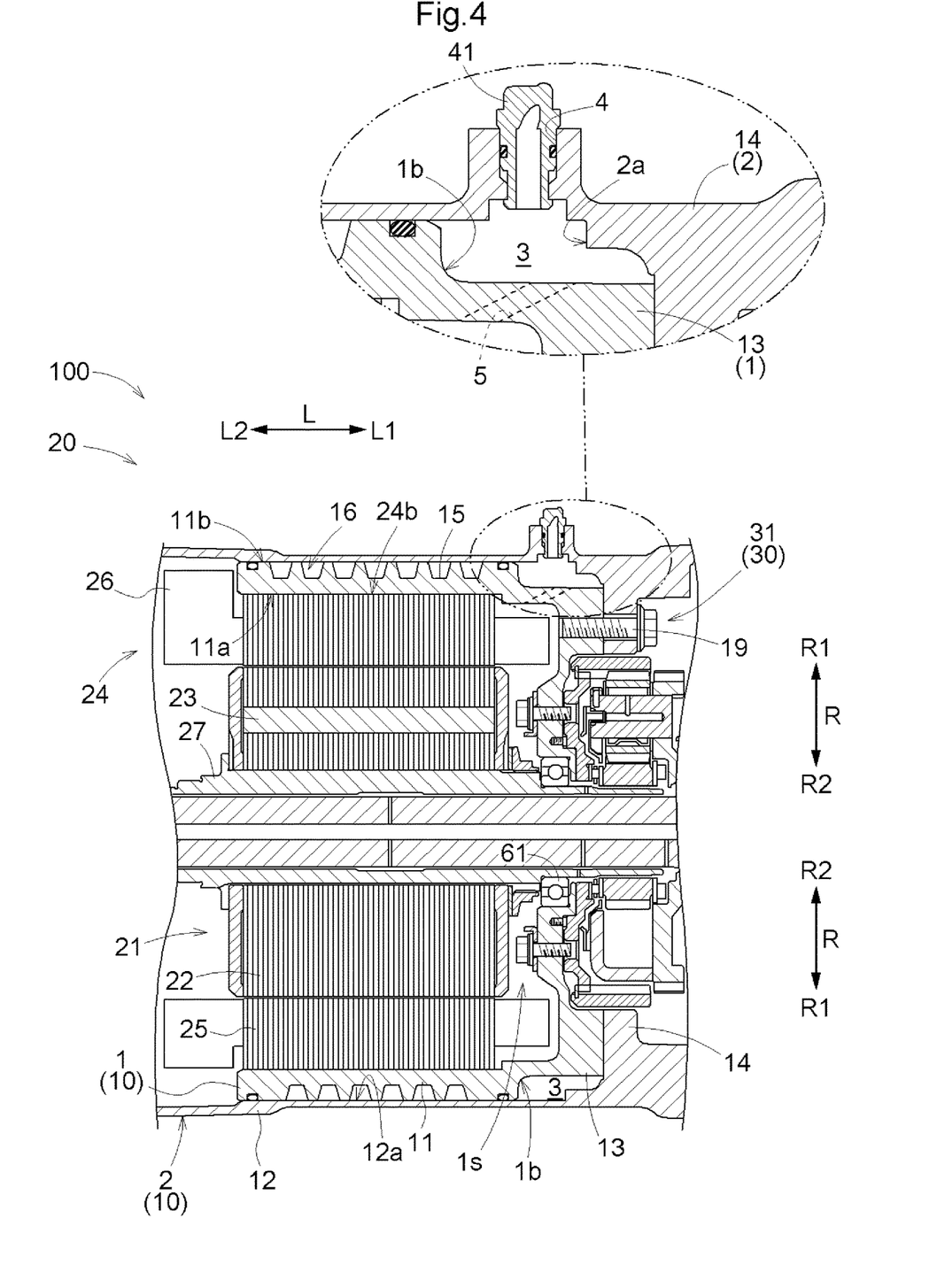
FIG. 4 is an axial sectional view showing another example of a rotary electric machine.

(1) In the above, a configuration is described as an example in which the second coupling portion 14 of the second tubular portion 12 extends to the inner radial side R2 more than the first coupling portion 13 of the first tubular portion 11, and the second coupling portion 14 supports the rotor bearing 61, which supports the rotor 21 such that the rotor 21 is rotatable, on the axial direction first side L1 with respect to the rotor 21. However, as illustrated in FIG. 4, the first coupling portion 13 of the first tubular portion 11 may extend to the inner radial side R2 more than the second coupling portion 14 of the second tubular portion 12, and the first coupling portion 13 may support the rotor bearing 61 on the axial direction first side L1 with respect to the rotor 21. As a matter of course, this does not prevent the form in which the rotor bearing 61 is supported by a member different from the first coupling portion 13 and the second coupling portion 14. For example, the rotor bearing 61 may be supported by another part of the inner case portion 1 and the outer case portion 2, or a member that configures the case 10 and that is a member other than the inner case portion 1 and the outer case portion 2.

(2) In the above, the form is described as an example in which the communication portion 5 is formed so as to pass through the first coupling portion 13 in the axial direction L, along the axial direction L. However, as illustrated in FIG. 4, the communication portion 5 may be formed so as to pass through the first coupling portion 13 along a direction inclined with respect to both the axial direction L and the radial direction R. Alternatively, although not shown, the communication portion 5 may be formed so as to pass through the first coupling portion 13 along the radial direction R.

(3) In the above, a form is shown as an example in which the coolant flow path 16 is formed between the inner case portion 1 and the outer case portion 2, that is, between the first tubular portion 11 and the second tubular portion 12. However, even when the case 10 is configured of the inner case portion 1 and the outer case portion 2, the coolant flow path 16 does not have to be formed between the inner case portion 1 and the outer case portion 2 (between the first tubular portion 11 and the second tubular portion 12).

(4) In the above, a form is shown as an example in which the air chamber 3 is formed so as to include a region formed in a space in which the first coupling portion 13 and the second coupling portion 14 face each other in the axial direction L. However, this does not prevent a form in which the air chamber 3 is formed without including the region formed in a space in which the first coupling portion 13 and the second coupling portion 14 face each other in the axial direction L. For example, even when the air chamber 3 is formed in a space in which the first coupling portion 13 and the second coupling portion 14 face each other in the radial direction R, since the air chamber 3 is formed in a space different from the housing space 1s of the rotary electric machine 20, it is possible to suppress oil from directly entering the air chamber 3 as compared to the case in which the air chamber 3 is formed in the housing space Is.

(5) In the above, a form is shown as an example in which the breather hole 4 and the communication portion 5 are disposed at different positions in the circumferential direction C of the stator 24. However, this does not prevent a form in which the breather hole 4 and the communication portion 5 are disposed at the same positions in the circumferential direction C of the stator 24. In this case, it is preferable that the breather hole 4 and the communication portion 5 be disposed at different positions in the axial direction L.

(6) In the above, a form is shown as an example in which the breather hole 4 is formed so as to pass through the outer case portion 2 in the radial direction R. However, the form of the breather hole 4 is not limited to this. For example, when the outer case portion 2 includes a wall portion extending in the radial direction R, the breather hole 4 may be formed so as to pass through the wall portion in the axial direction L. Alternatively, the breather hole 4 may be formed so as to pass through the outer case portion 2 along a direction inclined with respect to both the axial direction L and the radial direction R.

[Summary of Embodiment]

Hereinafter, a summary of the rotary electric machine (20) described above will be briefly described.

As one aspect, a rotary electric machine (20) includes: a stator (24); a rotor (21); and a case (10) for housing the stator (24) and the rotor (21) are provided, in which the case (10) includes an inner case portion (1) to which the stator (24) is fixed and an outer case portion (2) that houses the inner case portion (1), the inner case portion (1) includes a first coupling portion (13), the outer case portion (2) includes a second coupling portion (14), the first coupling portion (13) and the second coupling portion (14) are fixed to each other, an air chamber (3) communicated with an inside of the inner case portion (1) is formed between an outer surface (1b) of the inner case portion (1) and an inner surface (2a) of the outer case portion (2), and a breather hole (4) that communicates the air chamber (3) and an outside of the case (10) is formed in the outer case portion (2).

According to this configuration, the air chamber (3) that is a breather chamber, which is communicated with the inside of the inner case portion (1), is formed between the outer surface (1b) of the inner case portion (1) to which the stator (24) is fixed and the inner surface (2a) of the outer case portion (2) that houses the inner case portion (1). That is, it is not necessary to perform molding with a complicated mold by casting, and the position and volume of the air chamber (3) can be easily set freely. Further, since the air chamber (3) is formed as a chamber independent of an internal space, on the outside with respect to the outer surface (1b) of the inner case portion (1) in which the rotary electric machine (20) is housed, it is possible to suppress oil from directly entering the air chamber (3) even when oil is stirred by the rotor (21), etc. of the rotary electric machine (20), in the internal space (Is) of the inner case portion (1). Thus, it is possible to suppress oil from being blown out from the breather hole (4) that communicates the outside of the case (10) and the air chamber (3). In this way, according to the present configuration, an air chamber (3) serving as a breather chamber and a breather hole (4) that communicates the outside of a case (10) with the air chamber (3) can be easily molded, and the breather hole (4) can be provided so as to have a degree of freedom in an installation position and volume, so that oil does not easily blow out from the case (10) in which the rotary electric machine (20) is housed.

Here, it is preferable that the inner case portion (1) have a first tubular portion (11) having an inner peripheral surface (11a) in contact with an outer peripheral surface (24b) of the stator (24), the outer case portion (2) have a second tubular portion (12) that has a tubular shape and that covers an outer peripheral surface (11b) of the first tubular portion (11), and a coolant flow path (16) be formed between the first tubular portion (11) and the second tubular portion (12).

By configuring the case (10), in which the rotary electric machine (20) is housed, by the inner case portion (1) and the outer case portion (2), the coolant flow path (16) can be easily formed between the inner case portion (1) and the outer case portion (2), that is, between the first tubular portion (11) and the second tubular portion (12). According to this configuration, it is possible to suppress vibration and noise of the case (10) while ensuring high cooling efficiency with respect to the rotary electric machine (20).

Further, it is preferable that the first coupling portion (13) be formed so as to protrude to an inner radial side (R2) on an axial direction first side (L1), which is one side in an axial direction with respect to the stator (24), the second coupling portion (14) be formed so as to protrude to the inner radial side (R2) on the axial direction first side (L1), and the air chamber (3) include a region formed in a space in which the first coupling portion (13) and the second coupling portion (14) face each other in the axial direction (L).

According to this configuration, the air chamber (3) can be provided with a part extending along a space in which the first coupling portion (13) and the second coupling portion (14) face each other. Thus, even when oil enters the air chamber (3), it is possible to make it difficult for this oil to reach the breather hole (4) formed in the outer case portion (2). Therefore, according to this configuration, it is possible to make it more difficult for oil to blow out from the breather hole (4).

Further, when the first coupling portion (13) is formed so as to protrude from the first tubular portion (11) to the inner radial side (R2) on an axial direction first side (L1), and the second coupling portion (14) is formed so as to protrude from the second tubular portion (12) to the inner radial side (R2) on the axial direction first side (L1), it is preferable that the first coupling portion (13) and the second coupling portion (14) be fixed in a state of being in contact in the axial direction (L).

According to this configuration, the inner case portion (1) and the outer case portion (2) can be fixed to each other in a state in which the two are appropriately positioned, while suppressing outer shapes of the inner case portion (1) and the outer case portion (2) from becoming large in the radial direction (R).

Further, when the first coupling portion (13) is formed so as to protrude from the first tubular portion (11) to the inner radial side (R2) on an axial direction first side (L1), and the second coupling portion (14) is formed so as to protrude from the second tubular portion (12) to the inner radial side (R2) on the axial direction first side (L1), it is preferable that the first coupling portion (13) or the second coupling portion (14) support a rotor bearing (61) that supports the rotor (21) such that the rotor (21) is rotatable, on the axial direction first side (L1), which is one side in the axial direction (L) with respect to the rotor (21).

According to this configuration, since the rotor (21) can also be supported by the first coupling portion (13) or the second coupling portion (14) that fixes the inner case portion (1) and the outer case portion (2), the structure of the rotary electric machine (20) can be simplified.

It is preferable that the inner case portion (1) have a communication portion (5) that communicates a housing space (Is) in which the stator (24) is housed and the air chamber (3).

With this configuration, with the communication portion (5), the housing space (Is) and the outside of the case (10) can be appropriately communicated via the air chamber (3) and the breather hole (4). As a result, the change in internal pressure of the case (10) due to the expansion or contraction of air in the housing space (Is) can be reduced. Further, since the communication portion (5) is formed in the inner case portion (1) provided so as to surround the stator (24), it is possible to increase the degree of freedom in disposing the communication portion (5). Thus, it is easy to dispose the communication portion (5) at an appropriate position with respect to the air chamber (3) and the breather hole (4).

Further, when the inner case (1) has the communication portion (5), it is preferable that the breather hole (4) and the communication portion (5) be disposed at different positions in a circumferential direction (C) of the stator (24), in an axial view along the axial direction (L).

According to this configuration, a path from the housing space (Is) to the breather hole (4) can easily be made into a bent path. As a result, the configuration can be such that oil inside the housing space (Is) does not easily reach the breather hole (4).

When the inner case portion (1) has the communication portion (5), it is preferable that the first coupling portion (13) be formed so as to protrude to the inner radial side (R2), and the communication portion (5) be formed so as to pass through the first coupling portion (13) in the axial direction (L).

Oil that is present inside the housing space (Is) is often scattered in the radial direction due to centrifugal force and the like of a rotating member. According to this configuration, since the communication portion (5) is formed so as to pass through the first coupling portion (13) in the axial direction (L), the possibility that oil scattered in the radial direction enters the air chamber (3) through the communication portion (5) can be decreased, compared to the case in which the communication portion (5) is formed along the radial direction (R). That is, the configuration can be such that oil inside the housing space (Is) does not easily reach the breather hole (4).

When the inner case (1) has the communication portion (5), it is preferable that a wiring member (8w) that is disposed over the housing space (Is) and a space outside the inner case portion (1) be inserted in the communication portion (5).

According to this configuration, by sharing the communication portion (5) as a wiring region of the wiring member (8w), it is possible to save space as compared to the case in which the communication portion (5) that communicates the air chamber (3) and the housing space (is) is provided so as to be dedicated as an air passage.

It is preferable that the breather hole (4) be formed so as to pass through the outer case portion (2) in the radial direction (R).

The breather hole (4) is often disposed in an upper portion of the case (10) in a state in which the rotary electric machine (20) is mounted on a vehicle, etc. so that water or the like does not easily enter the inside of the case (10). In many cases, the rotary electric machine (20) that is a driving force source of the vehicle, etc. is disposed so that the rotation shaft is in a horizontal direction. Thus, when the breather hole (4) is formed so as to pass through the outer case portion (2) in the radial direction (R), the breather hole (4) can be easily disposed in the upper portion of the case (10).

DESCRIPTION OF THE REFERENCE NUMERALS

1: inner case portion
1s: housing space
2: outer case portion
3: air chamber
4: breather hole
5: communication hole
8w: resolver wiring (wiring member)
10: case
11: first tubular portion
11b: outer peripheral surface of inner case portion
12a: inner peripheral surface of outer case portion
13: first coupling portion
14: second coupling portion
16: coolant flow path
20: rotary electric machine
21: rotor
24: stator
24b: outer peripheral surface of stator
27: rotor shaft
61: rotor bearing
C: circumferential direction
L: axial direction
L1: axial direction first side
R: radial direction
R2: inner radial side

The invention claimed is:

1. A rotary electric machine comprising:
a stator;
a rotor;
a case for housing the stator and the rotor, wherein
the case includes an inner case portion to which the stator is fixed and an outer case portion that houses the inner case portion,
the inner case portion includes a first coupling portion,
the outer case portion includes a second coupling portion, the first coupling portion and the second coupling portion are fixed to each other, an air chamber communicated with an inside of the inner case portion is formed between an outer surface of the inner case portion and an inner surface of the outer case portion, a breather hole that communicates the air chamber and an outside of the case is formed in the outer case portion, the inner case portion has a first tubular portion having an inner peripheral surface in contact with an outer peripheral surface of the stator, the outer case portion has a second tubular portion that has a tubular shape and that covers an outer peripheral surface of the first tubular portion, a coolant flow path is formed between the first tubular portion and the second tubular portion, the first coupling portion is formed so as to protrude to an inner radial side on an axial direction first side, which is one side in an axial direction with respect to the stator, the second coupling portion is formed so as to protrude to the inner radial side on the axial direction first side, the air chamber includes a region formed in a space in which the first coupling portion and the second coupling portion face each other in the axial direction, and the first coupling portion and the second coupling portion are fixed by a fastening member.

2. The rotary electric machine according to claim 1, wherein the first coupling portion and the second coupling portion are fixed in a state of being in contact in the axial direction.

3. The rotary electric machine according to claim 1, wherein the first coupling portion or the second coupling portion supports a rotor bearing that supports the rotor such that the rotor is rotatable, on the axial direction first side, which is one side in the axial direction with respect to the rotor.

4. The rotary electric machine according to claim 1, wherein the inner case portion has a communication portion that communicates a housing space in which the stator is housed and the air chamber.

5. The rotary electric machine according to claim 4, wherein the breather hole and the communication portion are disposed at different positions in a circumferential direction of the stator, in an axial view along an axial direction.

6. The rotary electric machine according to claim 4, wherein
the first coupling portion is formed so as to protrude to an inner radial side, and
the communication portion is formed so as to pass through the first coupling portion in an axial direction.

7. The rotary electric machine according to claim 4, wherein a wiring member that is disposed over the housing space and a space outside the inner case portion is inserted in the communication portion.

8. The rotary electric machine according to claim 1, wherein
the breather hole is formed so as to pass through the outer case portion in a radial direction.

9. The rotary electric machine according to claim 1, wherein the second tubular portion and the second coupling portion are integrally formed as a one-piece unitary member.

* * * * *